(12) United States Patent
Kim (10) Patent No.: US 12,343,739 B2
(45) Date of Patent: Jul. 1, 2025

(54) MULTIPURPOSE SHOWER HEAD

(71) Applicant: Kisoo Kim, Gwangju-si (KR)

(72) Inventor: Kisoo Kim, Gwangju-si (KR)

( * ) Notice: Subject to any disclaimer, the term of this patent is extended or adjusted under 35 U.S.C. 154(b) by 438 days.

(21) Appl. No.: 17/912,032

(22) PCT Filed: Feb. 19, 2021

(86) PCT No.: PCT/KR2021/002095
§ 371 (c)(1),
(2) Date: Sep. 15, 2022

(87) PCT Pub. No.: WO2021/187761
PCT Pub. Date: Sep. 23, 2021

(65) Prior Publication Data
US 2023/0182153 A1 Jun. 15, 2023

(30) Foreign Application Priority Data
Mar. 16, 2020 (KR) .......... 10-2020-0032091

(51) Int. Cl.
*B05B 1/16* (2006.01)
*A61C 17/032* (2006.01)
(Continued)

(52) U.S. Cl.
CPC .......... *B05B 1/1636* (2013.01); *A61C 17/032* (2019.05); *B05B 1/185* (2013.01); *B05B 12/0024* (2018.08)

(58) Field of Classification Search
CPC ....... B05B 1/16; B05B 1/1627; B05B 1/1636; B05B 1/18; B05B 1/185; B05B 1/22;
(Continued)

(56) References Cited

U.S. PATENT DOCUMENTS

| 4,043,337 A | * | 8/1977 | Baugher | ............. A61C 17/032 |
| | | | | 601/162 |
| 4,564,005 A | * | 1/1986 | Marchand | ............. A61C 17/032 |
| | | | | 601/165 |

(Continued)

FOREIGN PATENT DOCUMENTS

| KR | 20-0220273 Y1 | 4/2001 |
| KR | 20-0223919 Y1 | 5/2001 |

(Continued)

*Primary Examiner* — Darren W Gorman
(74) *Attorney, Agent, or Firm* — Maschoff Brennan (57) ABSTRACT

Disclosed is a multipurpose shower head which can spray different amounts of water at different pressures through water spreading holes formed in three different portions thereof only by a simple operation of a lever, so that the use of a product can be very flexibly diversified according to a necessary purpose. Since the multipurpose shower head can very flexibly diversify the use of a product according to a necessary purpose, the multipurpose shower head can maximize the use convenience of the product and remarkably enhance the use satisfaction and value of the product. Moreover, purchase of only one shower head enables a user to not only take a shower, wash his or her mouth or use a bidet function, but also clean a bathroom without any problem. Therefore, the present invention can significantly reduce even the burden of purchasing a washing item of a bathroom cleaning item.

9 Claims, 6 Drawing Sheets

(51) Int. Cl.
*B05B 1/18* (2006.01)
*B05B 12/00* (2018.01)

(58) Field of Classification Search
CPC .............. B05B 12/002; B05B 12/0022; B05B 12/0024; A61C 17/032
See application file for complete search history.

(56) References Cited

U.S. PATENT DOCUMENTS

| | | | | |
|---|---|---|---|---|
| 5,070,553 | A * | 12/1991 | Chambers | ................. E03C 1/06 |
| | | | | 4/615 |
| 5,241,714 | A * | 9/1993 | Barry | .................... A47K 3/281 |
| | | | | 4/615 |
| 7,762,479 | B2 | 7/2010 | Li | |
| 2007/0213647 | A1* | 9/2007 | Incardona | ............ A61C 17/032 |
| | | | | 601/165 |
| 2009/0242666 | A1 | 10/2009 | Li | |
| 2015/0102130 | A1* | 4/2015 | Davenport | ................ B05B 1/16 |
| | | | | 239/289 |
| 2019/0060919 | A1* | 2/2019 | Daru | ...................... A47K 7/046 |
| 2020/0331007 | A1* | 10/2020 | Dierickx | ................ B05B 1/185 |
| 2021/0138488 | A1* | 5/2021 | Lin | .......................... B05B 1/18 |
| 2022/0250097 | A1* | 8/2022 | Lin | ...................... B05B 1/1636 |

FOREIGN PATENT DOCUMENTS

| | | | |
|---|---|---|---|
| KR | 20050005210 Y1 | 1/2005 | |
| KR | 200478927 Y1 | 12/2015 | |
| KR | 10-2017-0068764 A | 6/2017 | |
| KR | 10-1977200 B1 | 5/2019 | |
| WO | WO-0134011 A1 * | 5/2001 | ........... B05B 1/1636 |
| WO | WO-2021093239 A1 * | 5/2021 | ............... B05B 1/16 |

* cited by examiner

DETAIL 'A'

MULTIPURPOSE SHOWER HEAD

TECHNICAL FIELD

The present invention relates to a multipurpose shower head, and more particularly, to a multipurpose shower head for spraying water supplied from a water supply line through a plurality of spray holes when having a shower.

BACKGROUND ART

In general, a shower head is provided with a plurality of spray holes and is connected to a faucet through a water supply line, in order to receive water from the faucet through the water supply line and spray the water like a shower through the spray holes during shower.

In the case of such a conventional shower head, it has performed only a function of simply injecting water, which was supplied from a faucet through a water supply line, in the form of shower.

However, in recent years, shower heads capable of additionally supplying a variety of functional materials such as vitamins to water while removing impurities contained in the water during shower by applying various functions such as embedding a filter in a handle part of the shower head to remove impurities contained in the water supplied from a faucet, feeding vitamins to a filter, etc., have been developed and distributed.

Meanwhile, with recently increased interest in oral health, oral hygiene devices such as a water-pick capable of cleaning teeth and gums by injecting water at a high water pressure other than brushing have been developed and used.

However, in the case of such an oral hygiene device such as the water-pick, due to characteristics of washing the oral cavity by injecting the water filled in a bucket through a water-pick nozzle in a state in which the bucket is generally filled with water, there is a problem that bacteria may be bred (or be propagated) to thus adversely affect oral hygiene if the water is stored in the bucket over time.

Therefore, as disclosed in Korean Patent Publication No. 10-1977200 (Registration date: May 3, 2019, entitled: "Oral washing functional shower head") and Korean Patent Laid-Open Publication No. 10-2017-0068764 (Laid-open date: Jun. 20, 2017, entitled: "Shower with mouthwash"), a shower device ("shower") with mouth-washing function by mounting nozzles in a shower head that continuously discharges water without water stagnating has been recently developed and used.

A shower is usually used to spray and rinse the floor, washbasin, toilet, etc. for cleaning the same. However, in the case of a typical shower, it has weak water pressure and causes a difficulty in injecting water to a site far away from a shower booth to clean it. Further, although a shower having a mouthwash function can inject water far enough, an amount of the injected water is insufficient to clean a bathroom, hence involving a difficulty in cleaning the bathroom by injecting water with the shower.

Therefore, there is now a growing demand for a multifunctional shower head with various functions that make it possible to not only shower and mouthwash but also clean every corner of the bathroom by spray water with a single shower.

DISCLOSURE

Technical Problem

Therefore, it is an object of the present invention to provide a multipurpose shower head which may inject water at different pressures and quantities through water injection holes formed in three (3) different positions by only a simple lever operation, so that use of a product can be very flexibly diversified according to the required uses.

Another object of the present invention is to provide a multipurpose shower head in which a direct water injection hole formed in a head body may be detachably coupled with nozzles for various purposes such as a water-pick nozzle, a bidet nozzle, a nozzle with a cleaning tool, a nozzle with a toothbrush, etc., so that use of a product can be further diversified.

Other detailed objects of the present invention will be obviously known and understood by experts or researchers in the present technical field ("those skilled in the art") through specific contents described below.

Technical Solution

The present invention proposes a multipurpose shower head, including: a head body in which a main chamber receiving water from a water supply line is provided, a direct water injection hole detachably and replaceably coupled with an injection nozzle is provided, and a direct water supply pipe communicating with the direct water injection hole is provided; a spray cover installed in the head body, in which a plurality of high-pressure spray holes and low-pressure spray holes are provided to be separated from each other; a chamber forming means, which is installed in the head body to be disposed between the main chamber and the spray cover such that first to third chambers communicating with the high-pressure spray holes, the low-pressure spray holes and the direct water supply pipe, respectively, are provided between the spray cover and the chamber forming means; and a water channel switching means which is provided on each of the chamber forming means and the head body in order to selectively transfer the water supplied in the main chamber to any one of the first to third chambers, whereby the water can be discharged to the outside of the head body through any one selected from the high-pressure spray holes, the low-pressure spray holes and the direct water injection hole.

According to one embodiment, the chamber forming means may include: a sealing cover which is detachably installed in the head body to be disposed between the main chamber and the spray cover so as to seal the main chamber, and is provided with a chamber forming groove between the spray cover and the chamber forming means, as well as a direct water supply hole communicating with the direct water supply pipe; a first partition wall, which protrudes from the chamber forming groove and is in close contact with the spray cover side to thus be positioned between the high-pressure spray hole and the low-pressure spray hole, wherein a first chamber is formed inside to communicate with the high-pressure spray hole while a second chamber is formed on the outside to communicate with the low-pressure spray hole; and a second partition wall, which protrudes from the chamber forming groove to surround the direct water supply hole and is in close contact with the spray cover, wherein a third chamber is formed inside to communicate with the direct water supply pipe while the second chamber is formed on the outside to communicate with the low-pressure spray hole.

According to one embodiment, the water channel switching means may include: a first protrusion, which protrudes from the chamber forming means to be adjacent to the first chamber, wherein a first communication hole is provided to communicate the main chamber with the first chamber so as to supply the water of the main chamber to the first chamber; a second protrusion, which protrudes from the chamber forming means to be adjacent to the first protrusion, wherein a second communication hole is provided to communicate the main chamber with the second chamber so as to supply the water of the main chamber to the second chamber; a third protrusion, which protrudes from the chamber forming means to be adjacent to the second protrusion, wherein a third communication hole is provided to communicate the main chamber with the third chamber so as to supply the water of the main chamber to the third chamber; a lever which is rotatably installed inside the head body such that a part thereof protrudes to the outside of the head body; and a water channel switching plate, which rotates in conjunction with the lever according to rotation of the lever, so as to selectively open any one among the first to third communication holes.

In addition, the water channel switching means may further include a position fixing unit rotating in conjunction with the lever as the lever is rotated, thereby securing the position of the water channel switching plate, so that only one of the first to third communication holes may be selectively opened.

According to one embodiment, the position fixing unit may include: first to third position fixing holes formed at a predetermined interval in the water channel switching plate; a stopper, which is inserted into any one among the first to third position fixing holes by rotation of the water channel switching plate to secure the position of the water channel switching plate; and an elastic member, which is interposed between the stopper and the main chamber to elastically support the stopper.

In this regard, the water channel switching plate may include: a rotary plate body connected to the lever so as to be interlocked with the lever; an open hole formed on the rotary plate body to open any one of the first to third communication holes when the rotary plate body rotates in conjunction with the lever; and a sealing protrusion, which protrudes from the rotary plate body such that the protrusion is disposed in pairs at both sides of the open hole, so as to close the communication holes except for the one opened by the open hole among the first to third communication holes.

Meanwhile, the injection nozzle detachably and replaceably coupled to the direct water injection hole may be a water-pick nozzle.

For example, the water-pick nozzle may include: a nozzle cap, which is detachably and replaceably fastened to the direct water injection hole and is provided with a through-hole; and a nozzle body, which is slidingly inserted and fastened to the direct water supply pipe in the form of a piston so that at least a portion of the nozzle body is pushed by water pressure and protrudes toward the outside of the nozzle cap, thereby injecting the water from the direct water supply pipe to the outside in the form of direct water.

At this time, the nozzle body may have an upper end inclined toward the opposite side of the spray cover at a predetermined angle so that the water from the direct water supply pipe can be injected to the opposite side of the spray cover.

Meanwhile, the water-pick nozzle may further include a replacement tip detachably and replaceably coupled to the upper end of the nozzle body.

Advantageous Effects

As described above, the multipurpose shower head according to an embodiment of the present invention may allow the user to spray or inject water supplied from a water supply line at different pressures and quantities of water through any one selected from the direct water injection hole, high-pressure spray holes and low-pressure spray hole only by a simple lever operation.

Therefore, when having a shower, water may be sprayed at a low pressure through the low-pressure spray hole to shower. On the other hand, when cleaning the bathroom floor, washbasin, toilet, etc., it is possible to clean any site away from the shower booth at a predetermined distance without a difficulty by spraying a sufficient quantity of water enough to clean the floor at a high pressure through the high-pressure spray hole. Further, different nozzles such as a nozzle with a mouthwash function or bidet function, a nozzle with a cleaning tool, a nozzle with a toothbrush, etc. may be detachably and replaceably coupled to the direct water injection hole, thereby achieving an advantage of using the same for various purposes.

Eventually, the multipurpose shower head according to an embodiment of the present invention may very flexibly diversify use of a product according to required uses to thus maximize use convenience of the product, while use satisfaction and value of the product may also be greatly improved. Further, purchasing only a shower head may proceed some operations including, for example, shower to mouthwash, bidet function, as well as cleaning the bathroom without difficulties, which in turn attain effects of greatly reducing the burden of purchasing cleaning products and bathroom cleaning products.

In addition, other effects of the present invention will be obviously and clearly understood by those skilled in the art according to the specific details described below or in the process of implementing the present invention.

DETAILED DESCRIPTION OF PREFERRED EMBODIMENTS OF INVENTION

Since various changes may be applied to the present invention and various forms may be possible, specific embodiments are illustrated in the drawings and described in detail in the text. However, this is not intended to limit the present invention to the specific embodiments but it should be understood that all modifications, equivalents and substitutes are included in the spirit and scope of the present invention.

Terms such as first, second, etc. may be used to explain different elements, however, these elements should not be limited by the terms. The above terms are used only for the purpose of distinguishing one component from another. For example, without departing from the scope of the present invention, a first component may be referred to as a second component and, similarly, a second component may also be referred to as a first component.

The terminology used in the present application is only used to describe specific embodiments and is not intended to limit the present invention. The singular expression may include the plural expression unless clearly dictated otherwise in the context. In the present application, terms such as "include" or "have" are intended to designate that a feature, number, step, operation, component, part or a combination thereof described in the specification exists, and it should be understood that the existence or possible addition of one or more other features, numbers, steps, operations, components, parts or combinations thereof is not precluded.

Unless defined otherwise, all terms used herein, including technical or scientific terms, have the same meanings as commonly understood by those skilled in the art to which the present invention pertains.

Terms such as those defined in commonly used dictionaries should be interpreted as having a meaning consistent with the meaning in the context of the related art, and should not be interpreted in an ideal or excessively formal meaning unless explicitly defined in the present application.

Hereinafter, with reference to the drawings, preferred embodiments of the present invention will be described in more detail.

Figure 1:
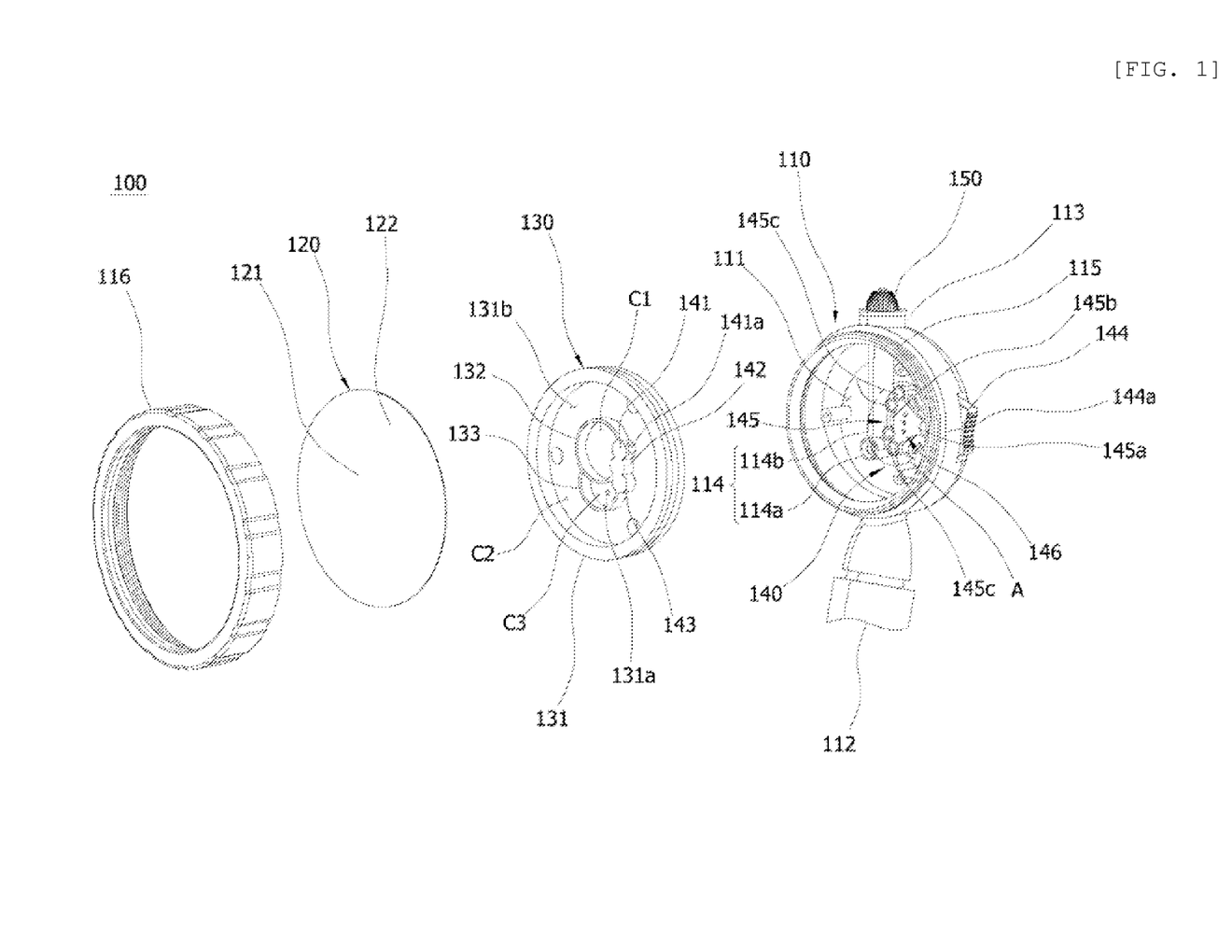
FIG. 1 is an exploded perspective view of a multipurpose shower according to an embodiment of the present invention.
Figure 2:
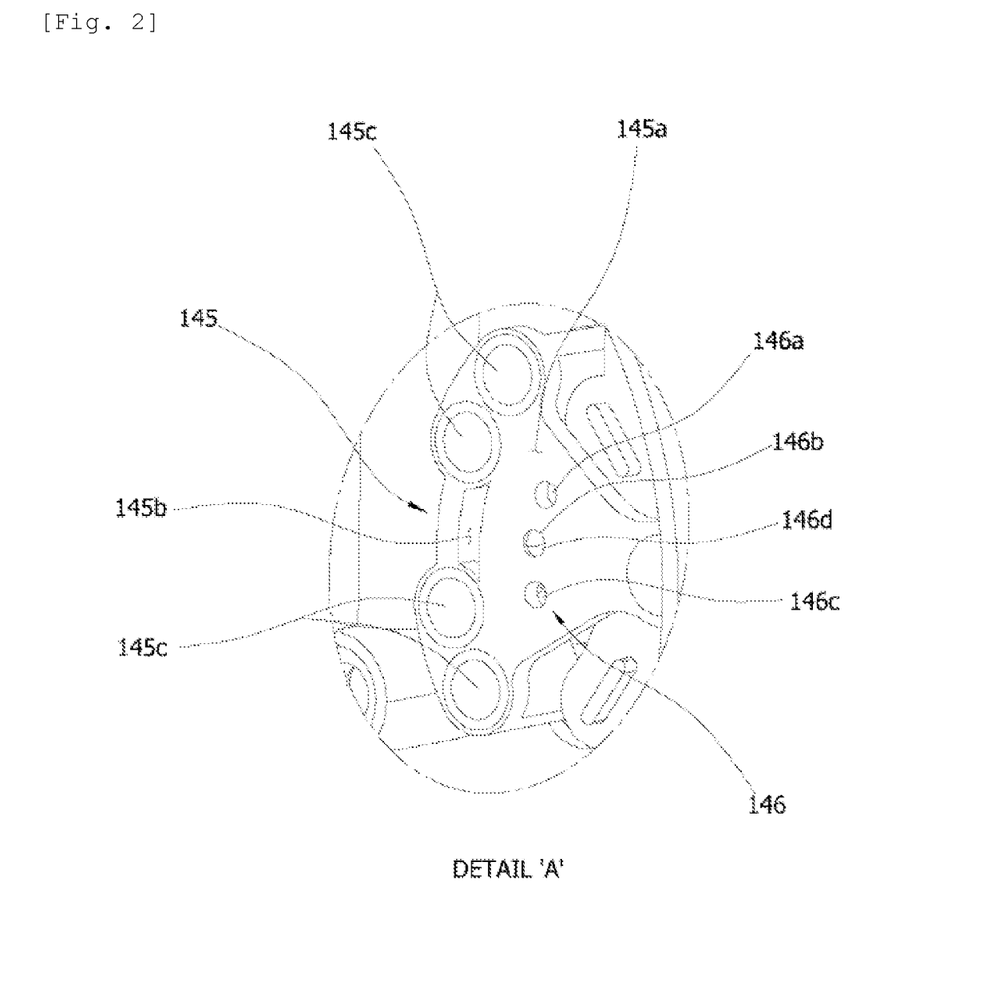
FIG. 2 is an enlarged view taken along "A" in FIG. 1.
Figure 3:
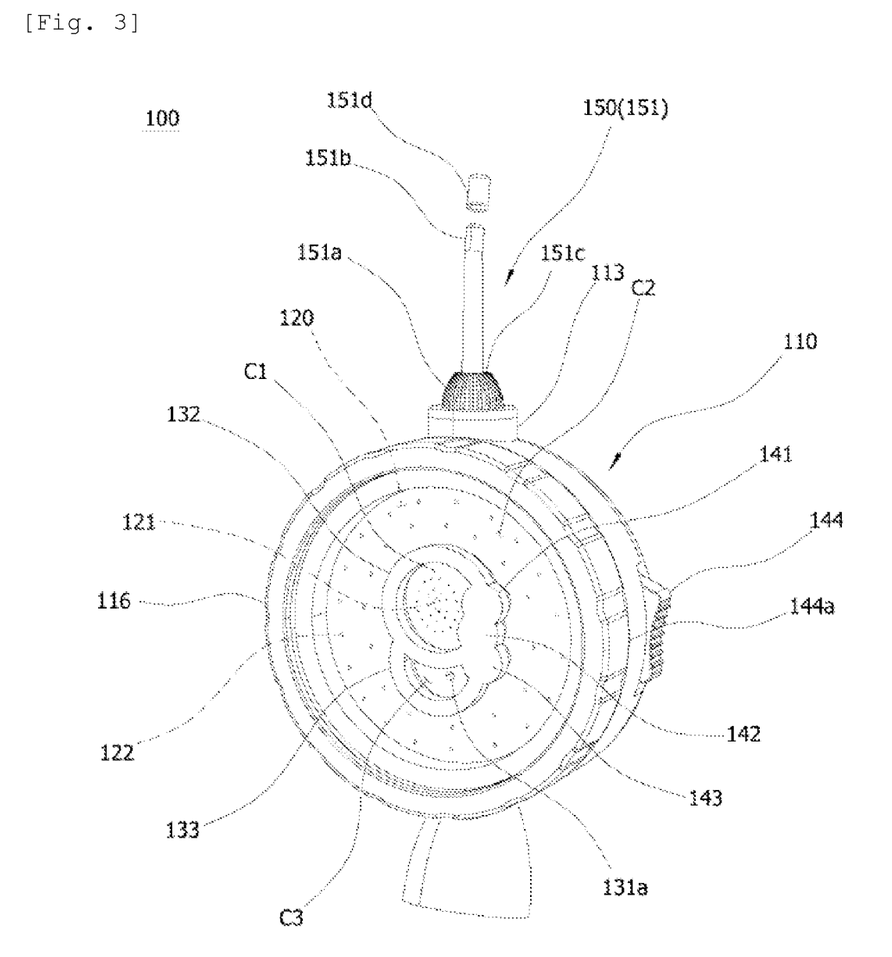
FIG. 3 is a perspective view of a multipurpose shower equipped with a water-pick nozzle.
Figure 4:
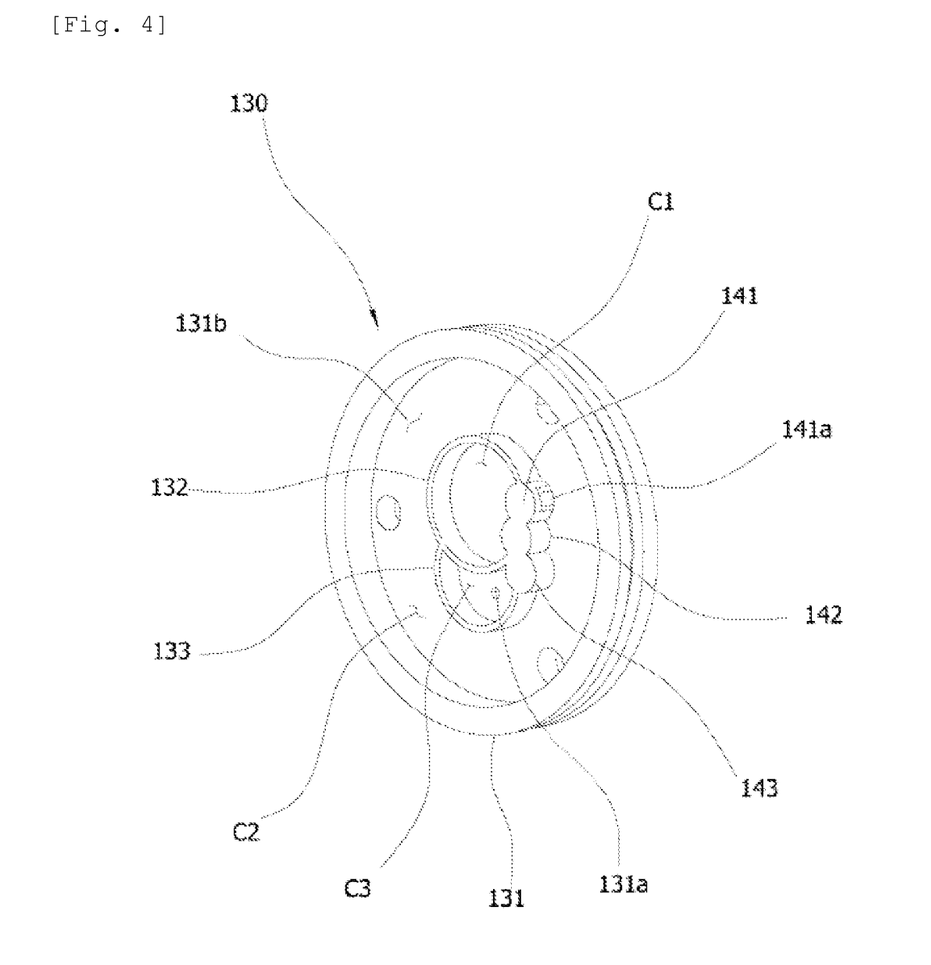
FIG. 4 is a front perspective view illustrating a chamber forming means.
Figure 5:
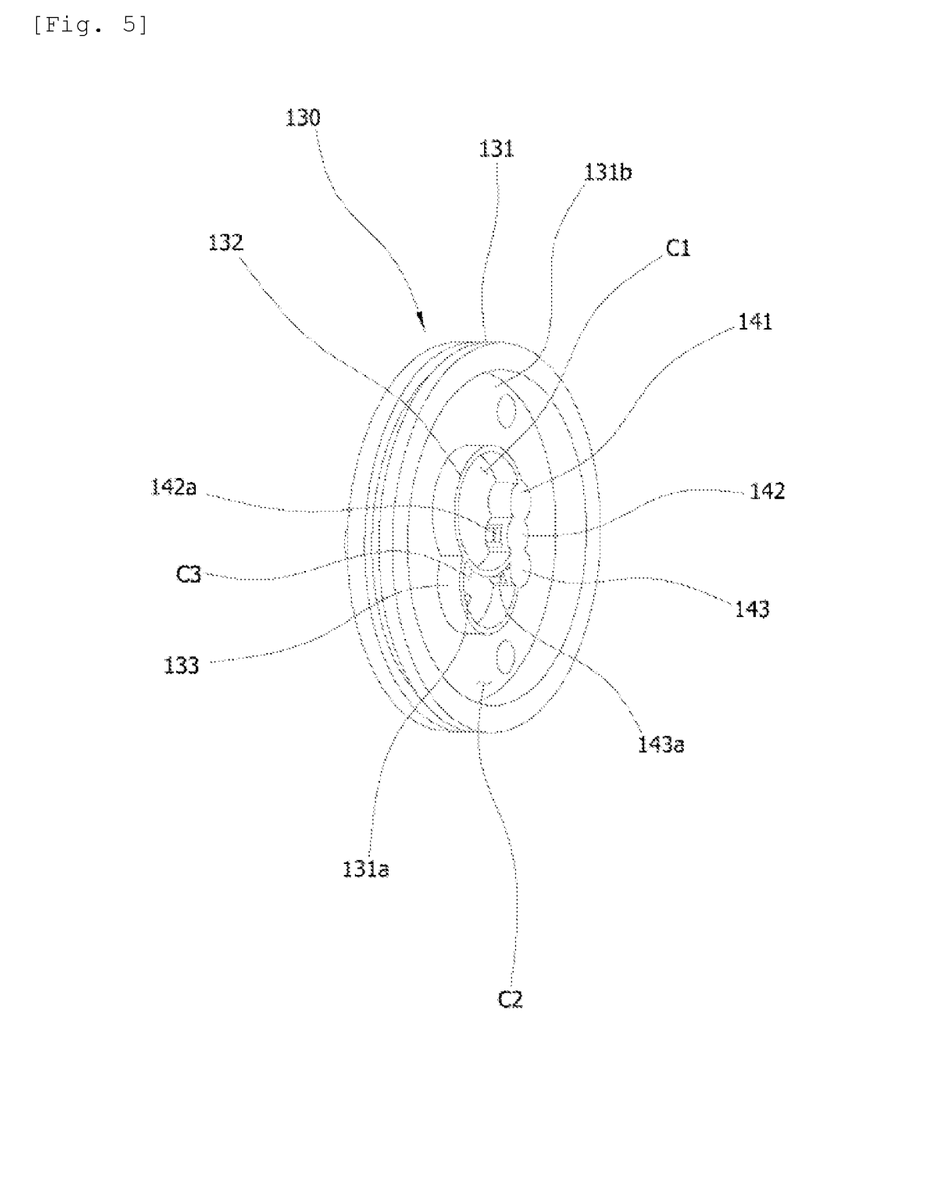
FIG. 5 is another front perspective view illustrating a chamber forming means.
Figure 6:
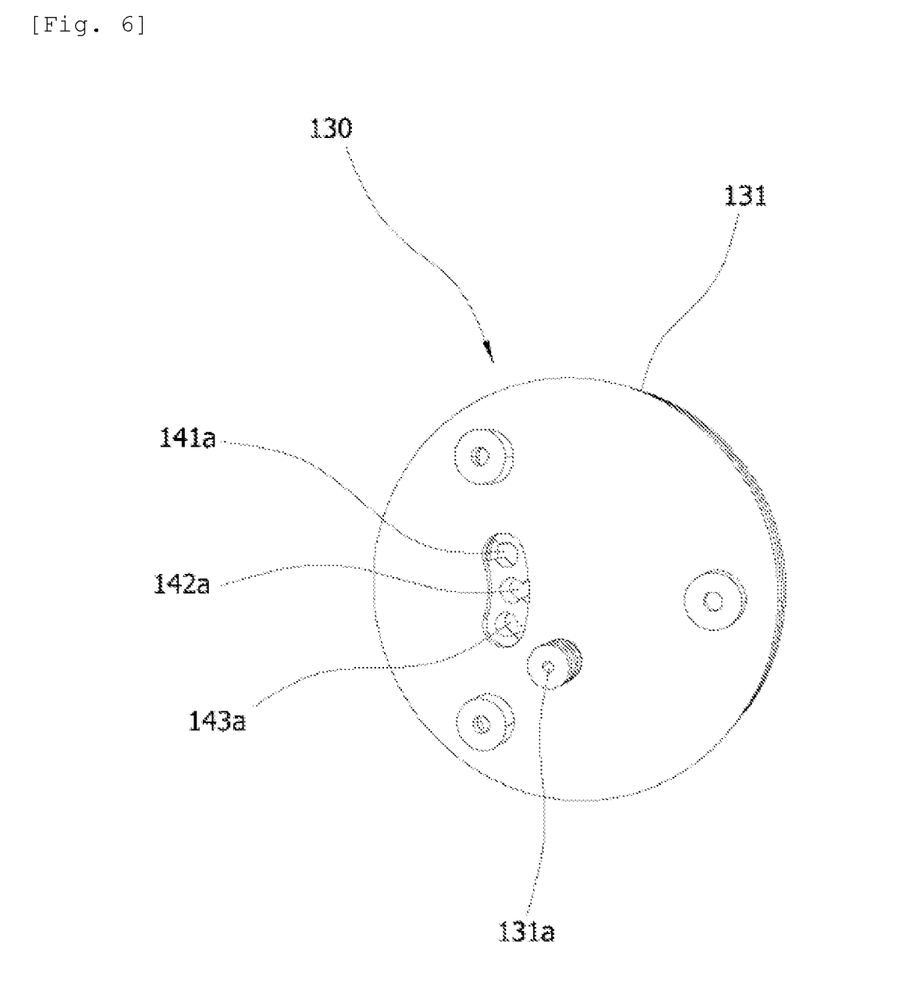
FIG. 6 is a rear perspective view illustrating a chamber forming means.

FIG. 1 is an exploded perspective view of a multipurpose shower according to an embodiment of the present invention; FIG. 2 is an enlarged view taken along "A" in FIG. 1; FIG. 3 is a perspective view of a multipurpose shower equipped with a water-pick nozzle; FIG. 4 is a front perspective view illustrating a chamber forming means; FIG. 5 is another front perspective view illustrating a chamber forming means; and FIG. 6 is a rear perspective view illustrating a chamber forming means.

Referring to FIGS. 1 to 6, the multipurpose shower head 100 according to an embodiment of the present invention may have a head body 110, a spray cover 120, a chamber forming means 130 and a water channel switching means 140.

The head body 110 may include: a main chamber 111 provided inside; a handle part 112 provided at a lower end thereof, which is connected to a water supply line (not shown) while communicating with the main chamber 111, simultaneously, so that the water supplied through the water supply line may be introduced into the main chamber 111 through the handle part 112.

On the other hand, a direct water injection hole 113 may be provided on an upper end of the head body 110, through which the injection nozzle 150 can be detachably and replaceably coupled.

In this regard, a screw part may be formed inside the direct water injection hole 113 to allow the injection nozzle 150 to be detachably and replaceably screwed to the direct water injection hole 113.

Further, the main chamber 111 of the head body 110 may be provided with a direct water supply pipe 114 therein, which is connected to communicate with the direct water injection hole 113.

For example, the direct water supply pipe 114 may include a first direct water feed duct 114a and a second direct water feed duct 114b.

The first direct water feed duct 114a may be provided inside the main chamber 111 of the head body 110 in order to communicate with the direct water injection hole 113.

The second direct water feed duct 114b may be provided inside the main chamber 111 in order to communicate with the first direct water feed duct 114a and also communicated with the direct water supply hole 131a provided in the sealing cover 131 of the chamber forming means 130 described below.

Meanwhile, the screw part 115 may be formed in the front portion of an outer periphery of the head body 110.

Further, although not shown in the drawings, a filter capable of removing foreign substances by filtering the water supplied from the water supply line, or a filter with different functions to provide vitamins, etc. while removing foreign substances contained in the water, simultaneously, may be built in the head body 110 or the handle part.

The spray cover 120 may be interposed between a head cap 116, which is disposed in the front portion inside the head body 110 and screw-coupled to the screw part 115 formed in the front portion of the outer periphery of the head body 110, and the head body 110.

Meanwhile, the spray cover 120 may be provided with a plurality of high-pressure spray holes 121 and a plurality of low-pressure spray holes 122, which are separately distinguished from each other.

For example, the high-pressure spray hole 121 may be provided in plural at a predetermined interval on the spray cover 120 to be positioned inside a first chamber C1, so as to spray the water introduced into the first chamber C1 at a high pressure outside the head body 110.

Further, the low-pressure spray hole 122 may be provided in plural at a predetermined interval on the spray cover to be positioned inside a second chamber C2, so as to spray the water introduced into the second chamber C2 at a low pressure outside the head body 110.

The chamber forming means 130 may be installed in the head body 110 to be disposed between the main chamber 111 and the spray cover 120, wherein first to third chambers C1, C2 and C3 communicating with the high-pressure spray hole 121, the low-pressure spray hole 122 and the direct water supply pipe 114, respectively, are provided between the chamber forming means and the spray cover 120.

For example, the chamber forming means 130 may include a sealing cover 131, a first partition wall 132 and a second partition wall 133.

The sealing cover 131 may be detachably installed on the head body 110 to be disposed between the main chamber 111 and the spray cover 120 so as to seal the main chamber 111 and, at the same time, may be provided with a chamber forming groove 131b between the spray cover 120 and the sealing cover, as well as a direct water supply hole 131a communicating with the direct water supply pipe 114.

At this time, since a watertight packing (not shown) is interposed between an outer periphery of the sealing cover 131 and the head body 110, water introduced into the main chamber 111 of the head body 110, that is, water inside the main chamber 111 may be prevented from leaking between the outer periphery of the sealing cover 131 and the head body 110.

The first partition wall 132 may protrude from the chamber forming groove 131b and be in close contact with the spray cover 120 to be positioned between the high-pressure spray hole 121 and the low-pressure spray hole 122, wherein a first chamber C1 is formed inside to communicate with the high-pressure spray hole 121, while a second chamber C2 is formed on the outside to communicate with the low-pressure spray hole 122.

For example, the first partition wall 132 protrudes from the chamber forming groove 131b in a circular shape to surround the high-pressure spray hole 121 and is in close contact with the spray cover side 120, whereby a first camber C1 communicating with the high-pressure spray hole 121 may be formed inside the first partition wall 132. Further, in the case of the chamber forming groove 132b on the outside of the first partition wall 132, a second chamber C2 communicating with the low-pressure spray hole 122 may be formed.

The second partition wall 133 protrudes from the chamber forming groove 131b to surround the direct water supply hole 131a and is in close contact with the spray cover 120, whereby a third chamber C3 communicating with the direct water supply hole 131a is formed inside the second partition wall 133 while a second chamber C2 communicating with the low-pressure spray hole 122 is formed on the outside of the same.

At this time, the second chamber C2 is formed to have the largest area, the third chamber C3 is formed to have the smallest area, and the first chamber C1 is formed to have an area smaller than the second chamber C2 and larger than the third chamber C3.

Therefore, the water introduced into the third chamber C3 may be injected at the highest pressure through the direct water supply pipe 114 and the direct water injection hole 113 in sequential order, the water introduced into the second chamber C2 may be injected at the lowest pressure through the low-pressure spray hole 122, and the water introduced into the first chamber C1 may be injected at a pressure lower than that of the water introduced into the third chamber C3 and higher than that of the water introduced into the second chamber C2 through the high-pressure spray hole 121.

The water channel switching means 140 may be provided in each of the chamber forming means 130 and the head body 110, in order to selectively transfer the water supplied into the main chamber 111 to any one chamber among the first to third chambers C1, C2 and C3, and then, discharge the water to the outside of the head body 110 through any one selected among the direct water injection hole 113, the high-pressure spray hole 121 and the low-pressure spray hole 122.

For example, the water channel switching means 140 may include a first protrusion 141, a second protrusion 142, a third protrusion 143, a lever 144, and a channel switching plate 145.

The first protrusion 141 may be formed to protrude from the chamber forming means 140 in order to be adjacent to the first chamber C1.

More specifically, the first protrusion 141 may protrude from the sealing cover 131 in order to be adjacent to the first chamber C1.

On the other hand, inside the first protrusion 141, a first communication hole 141a may be provided to communicate the main chamber 111 and the first chamber C1 together, so as to transfer the water in the main chamber 111 to the first chamber C1.

The second protrusion 142 may protrude from the sealing cover 131 of the chamber forming means 130 in order to be adjacent to the first protrusion 141. Inside the second protrusion 142, a second communication hole 142a may be provided to communicate the main chamber 111 and the second chamber C2 together, so as to transfer the water in the main chamber 111 to the second chamber C2.

The third protrusion 143 may protrude from the sealing cover 131 of the chamber forming means 130 in order to be adjacent to the second protrusion 142. Inside the third protrusion 143, a third communication hole 143a may be provided to communicate the main chamber 111 and the third chamber C3 together, so as to transfer the water in the main chamber 111 to the third chamber C3.

The lever 144 may be rotatably installed inside the head body 110 so that a part thereof protrudes outside the head body 110.

On the other hand, a plurality of friction protrusions 144a may protrude from one side of the lever 144 protruding to the outside of the head body 110 in order to easily rotate the lever 144 while preventing the hand of a user from slipping.

The water channel switching plate 145 is rotated in conjunction with the lever 144 according to rotation of the lever 144, so as to selectively open only any one of the first to third communication holes 141a, 141b and 141c.

For example, the water channel switching plate 145 may include a rotary plate body 145a, an open hole 145b and a sealing protrusion 145c.

The rotary plate body 145a is formed in a sector shape so that one side of thereof having a narrow width may be connected to the lever 144 to interlock with the lever 144.

As the rotary plate body 145a rotates in conjunction with the lever 144, the open hole 145b may be formed in the center of the other side of the rotary plate body 145a in order to open any one of the first to third communication holes 141a, 141b and 141c.

The sealing protrusion 145c may protrude from the rotary plate body 145a such that the sealing protrusion is positioned in pairs at both sides of the open hole 145b, so that the remaining communication holes except for the communication hole opened by the open hole 145b among the first to third communication holes 141a, 141b and 141c, can be closed.

Moreover, the water channel switching means 140 may further include a position fixing unit 146.

The position fixing unit 146 may secure a position of the water channel switching plate 145 in order to selectively open any one of the first to third communication holes 141a, 141b and 141c because the position fixing unit rotates in conjunction with the lever 144 by rotating the lever 144.

For example, the position fixing unit 146 may include first to third position fixing holes 146a, 146b and 146c, a stopper 146d, and an elastic member (not shown).

The first to third position fixing holes 146a, 146b and 146c may be arranged on the water channel switching plate 145 at a predetermined interval.

As the water channel switching plate 145 rotates, the stopper 146d is inserted into any one among the first to third position fixing holes 146a, 146b and 146c to thus secure the position of the water channel switching plate 145.

The elastic member is interposed between the stopper 146d and the main chamber 111 to elastically support the stopper 146d, whereby the stopper 146d can be elastically inserted into any one among the first to third position fixing holes 146a, 146b and 146c according to rotation of the water channel switching plate 145.

Meanwhile, the injection nozzle detachably and replaceably coupled to the direct water injection hole 113 may include nozzles for various purposes that can be coupled to the direct water injection hole 113, for example, a water-pick nozzle 151, a bidet nozzle (not shown), a nozzle with a cleaning tool, and a nozzle with a toothbrush, etc.

At this time, the water-pick nozzle 151 detachably and replaceably coupled to the direct water injection hole 113 may include a nozzle cap 151a and a nozzle body 151b.

The nozzle cap 151a may be detachably and replaceably fastened to the direct water injection hole 115 and may be provided with a through-hole 151c.

The nozzle body 151b may be slidingly inserted and fastened to the direct water supply pipe 114 in the form of a piston and, when water is supplied from the third chamber C3 to the direct water supply pipe 114, a part of the nozzle body 151b is pushed by water pressure and protrudes to the outside of the nozzle cap 151a through the through-hole 151c of the nozzle cap 151a so that the water of the direct water supply pipe 114 can be directly injected to the outside in the form of a direct water flow.

For example, the nozzle body 151b may have an upper end inclined at a predetermined angle toward the opposite side of the spray cover 120 in order to inject the water of the direct water supply pipe 114 to the opposite side of the spray cover.

Therefore, when a user washes his teeth using the water-pick nozzle 151, even if water is sprayed through the high-pressure spray hole 121 or the low-pressure spray hole 122 by incorrectly adjusting the position of the lever 144, the water sprayed through the high-pressure spray hole 121 or the low-pressure spray hole 122 is not sprayed toward the user's body side by operating the lever 144 while holding the handle in order to move the spray cover 120 on the opposite side of the user's body, thereby improving convenience of use.

This nozzle body 151b is also slidingly fastened to the direct water supply pipe 114 to be detachable and replaceable therefrom, so that family members may possess and use separate nozzle bodies 151b to wash teeth, thereby cleaning teeth in a sanitary way.

Further, the water-pick nozzle 151 may further include a replacement tip 151d.

The replacement tip 151d may be formed of a soft material harmless to the human body such as silicone, and may be detachably and replaceably coupled to an upper end of the nozzle body 151 so that, even when the water-pick nozzle 151 is used while the replacement tip 151d is in contact with the teeth or gums as closely as possible, it is possible to prevent damage to the teeth or gums due to impact applied thereto by the water-pick nozzle 151.

At this time, the replacement tip 151d may be made in different colors for family members and is coupled to the nozzle body 151b provided for each family member so that the family member can distinguish each nozzle body quickly and easily, thereby enabling hygienic use of the water-pick nozzle 151.

Again, an operation process of the multipurpose shower head according to an embodiment of the present invention will be described with reference to FIGS. 1 to 6.

For convenience of explanation, the operation process will be described separately for a high-pressure spray mode, a low-pressure spray mode and a direct water injection mode.

First, an operation of the multipurpose shower head according to an embodiment of the present invention in the high-pressure spray mode will be described.

Referring to FIGS. 1 to 6, in order to spray water in the high-pressure spray mode using the multipurpose shower head 100 according to an embodiment of the present invention, a user operates firstly the lever 144 to rotate the water channel switching plate 145, whereby the open hole 145b communicates with the first communication hole 141a provided in the first protrusion 141, while the sealing protrusions 145c positioned on both sides of the open hole 145b close the second communication hole 142a provided in the second protrusion 142 and the third communication hole 143a provided in the third protrusion 143.

As described above, when the lever 144 is operated to rotate the water channel switching plate 145 by a predetermined angle and thus the open hole 145b reaches a position where it communicates with the first communication hole 141a, an upper end of the stopper 146d may be inserted into the second position fixing hole 146b so that the water channel switching plate 145 is no longer rotated but a position thereof may be stably secured. Further, the stopper 146d may become a state of elastically and closely contacting the second position fixing hole 146b by an elastic force of the elastic member.

When the second and third communication holes 142a and 143a are closed by the water channel switching plate 145 and the first communication hole 141a communicates with the open hole 145b of the water channel switching plate 145, the water introduced from the water supply line to the main chamber 111 through the handle part 112 passes through the open hole 145b and the first communication hole 141a sequentially, and then, flows into the first chamber C1.

In more detail, since the second and third communication holes 142a and 143a are closed by the water channel switching plate 145, the water introduced into the main chamber 111 from the water supply line through the handle part 112 does not flow into the second and third chambers C2 and C3 through the second and third communication holes 142a and 143a, instead, flows only into the first chamber C1 through the first communication hole 141a communicating with the open hole 145b of the water channel switching plate 145.

As such, since the water in the main chamber 111 does not flow into the second and third chambers C2 and C3, but only flows into the first chamber C1, the water is not sprayed to the outside of the head body 110 through the low-pressure spray hole 122 and the direct water injection hole 113, which communicate with the second and third chambers C2 and C3, respectively, instead, is sprayed to the outside of the head body 110 only through the high-pressure spray hole 121 communicating with the first chamber C1.

At this time, the first chamber C1 is formed to have an area smaller than that of the second chamber C2 and larger than that of the third chamber C3, so that a water pressure inside the first chamber C1 may be relatively higher than a water pressure inside the second chamber C2 and relatively lower than a water pressure inside the third chamber C3.

Therefore, the water sprayed to the outside of the head body 110 through the high-pressure spray hole 121 after flowing into the first chamber C1 may be sprayed to the outside of the head body 110 at a relatively higher pressure than the water sprayed to the outside of the head body 110 through the low-pressure spray hole 122 after flowing into the second chamber C2, in addition, may be sprayed to the outside of the head body at a relatively lower pressure than the water injected to the outside of the head body 110 through the direct water injection hole 113 after flowing into the third chamber C3.

Next, an operation process of the multipurpose shower head according to an embodiment of the present invention in the low-pressure spray mode will be described.

In order to spray water in the low-pressure spray mode using the multipurpose shower head 100 according to an embodiment of the present invention, a user operates firstly the lever 144 to rotate the water channel switching plate 145, whereby the open hole 145b communicates with the second communication hole 142a provided in the second protrusion 142, while a pair of the sealing protrusions 145c positioned on one side of the open hole 145b closes the first communication hole 141a provided in the first protrusion 141 and the third communication hole 143a provided in the third protrusion 143.

As described above, when the lever 144 is operated to rotate the water channel switching plate 145 by a predetermined angle and thus the open hole 145b reaches a position where it communicates with the second communication hole 142a, an upper end of the stopper 146d may be inserted into the first position fixing hole 146a so that the water channel switching plate 145 is no longer rotated but a position thereof may be stably secured. Further, the stopper 146d may become a state of elastically and closely contacting the first position fixing hole 146a by an elastic force of the elastic member.

When the first and third communication holes 141a and 143a are closed by the water channel switching plate 145 and the second communication hole 142a communicates with the open hole 145b of the water channel switching plate 145, the water introduced from the water supply line to the main chamber 111 through the handle part 112 passes through the open hole 145b and the second communication hole 142a sequentially, and then, flows into the second chamber C2.

In more detail, since the first and third communication holes 141a and 143a are closed by the water channel switching plate 145, the water introduced into the main chamber 111 from the water supply line through the handle part 112 does not flow into the first and third chambers C1 and C3 through the first and third communication holes 141a and 143a, instead, flows only into the second chamber C2 through the second communication hole 142a communicating with the open hole 145b of the water channel switching plate 145.

As such, since the water in the main chamber 111 does not flow into the first and third chambers C1 and C3, but only flows into the second chamber C2, the water is not sprayed to the outside of the head body 110 through the high-pressure spray hole 121 and the direct water injection hole 113, which communicate with the first and third chambers C1 and C3, respectively, instead, is sprayed to the outside of the head body 110 only through the low-pressure spray hole 122 communicating with the second chamber C2.

At this time, the second chamber C2 is formed to have an area larger than that of each of the first and third chambers C1 and C3, so that a water pressure inside the second chamber C2 may be relatively lower than a water pressure inside each of the first and third chambers C1 and C3.

Therefore, the water sprayed to the outside of the head body 110 through the low-pressure spray hole 122 after flowing into the second chamber C2 may be sprayed to the outside of the head body 110 at a relatively lower pressure than the water sprayed or injected to the outside of the head body 110 through the high-pressure spray hole 121 and the direct water injection hole 113 after flowing into the first and third chambers C1 and C3, respectively.

Next, an operation process of the multipurpose shower head according to an embodiment of the present invention in the direct water injection mode will be described.

In order to inject water in the direct water injection mode using the multipurpose shower head 100 according to an embodiment of the present invention, a user operates firstly the lever 144 to rotate the water channel switching plate 145, whereby the open hole 145b communicates with the third communication hole 143a provided in the third protrusion 143, while a pair of the sealing protrusions 145c positioned at the opposite side of the open hole 145b closes the first and second communication holes 141a and 142a provided in the first and second protrusions 141 and 142, respectively.

As described above, when the lever 144 is operated to rotate the water channel switching plate 145 by a predetermined angle and thus the open hole 145b reaches a position where it communicates with the third communication hole 143a, an upper end of the stopper 146d may be inserted into the third position fixing hole 146c so that the water channel switching plate 145 is no longer rotated but a position thereof may be stably secured. Further, the stopper 146d may become a state of elastically and closely contacting the third position fixing hole 146c by an elastic force of the elastic member.

When the first and second communication holes 141a and 142a are closed by the water channel switching plate 145 and the third communication hole 143a communicates with the open hole 145b of the water channel switching plate 145, the water introduced from the water supply line to the main chamber 111 through the handle part 112 passes through the open hole 145b and the third communication hole 143a sequentially, and then, flows into the third chamber C3.

In more detail, since the first and second communication holes 141a and 142a are closed by the water channel switching plate 145, the water introduced into the main chamber 111 from the water supply line through the handle part 112 does not flow into the first and second chambers C1 and C2 through the first and second communication holes 141a and 142a, instead, flows only into the third chamber C3 through the third communication hole 143a communicating with the open hole 145b of the water channel switching plate 145.

As such, since the water in the main chamber 111 does not flow into the first and second chambers C1 and C2, but only flows into the third chamber C3, the water is not sprayed to the outside of the head body 110 through the high-pressure spray hole 121 and the low-pressure spray hole 122, which communicate with the first and second chambers C1 and C2, respectively.

Meanwhile, the water introduced into the third chamber C3 may flow again into a first direct water feed duct 114a through the direct water supply hole 131a formed in the sealing cover 131 in order to be placed inside the third chamber C3, followed by passing through a second direct water feed duct 114b and being injected to the outside the head body 110 through the injection nozzle 150 coupled to the direct water injection hole 113.

At this time, the third chamber C3 is formed to have an area smaller than that of each of the first and second chambers C1 and C2, so that a water pressure inside the third chamber C3 may be relatively higher than a water pressure inside each of the first and second chambers C1 and C2.

Therefore, the water injected to the outside of the head body 110 through the injection nozzle 150 after flowing into the third chamber C3 and passing through the direct water supply hole 131a and the first and second direct water feed ducts 114a and 114b may be injected to the outside of the head body 110 at a relatively higher pressure than the water sprayed to the outside of the head body 110 through the high-pressure spray hole 121 and the lower-pressure spray hole 122 after flowing into the first and second chambers C1 and C2, respectively.

Meanwhile, if the water-pick nozzle 151 is installed as the injection nozzle 150 in the direct water injection hole 113, when water flows from the first direct water feed duct 114a to the second direct water feed duct 114b, the nozzle body 151b, which is slidingly inserted and fastened in the form of a piston into the second direct water feed duct 114b, may be pushed by the pressure of the water flowing into the second direct water feed duct 114b and thus protrude to the outside of the nozzle cap 151a through the through-hole 151c of the nozzle cap 151a, thereby injecting water in the form of high-pressure direct water to the outside of the head body 110 through the nozzle body 151b, so that a user can wash or clean teeth and gums using the nozzle body 151b of the water-pick nozzle 151.

As described above, the multipurpose shower head 100 according to an embodiment of the present invention enables the user to spray or inject water, which is supplied from the water supply line, at different pressures and quantities of the water through any one selected among the direct water injection hole 113, the high-pressure spray hole 121 and the low-pressure spray hole 122 only by simply operating the lever 144.

Therefore, when having a shower, water may be sprayed at a low pressure through the low-pressure spray hole 122 to shower. On the other hand, when cleaning the bathroom floor, washbasin, toilet, etc., it is possible to clean any site away from the shower booth at a predetermined distance without a difficulty by spraying a sufficient quantity of water enough to clean the floor at a high pressure through the high-pressure spray hole 121.

Further, different nozzles 150 having various functions may be detachably and replaceably coupled to the direct water injection hole 113, thereby enabling use of the product for various purposes.

For example, when the water-pick nozzle 151 is coupled to the direct water injection hole 113, mouthwash may be carried out using a stream of water injected in the form of direct water through the water-pick nozzle 151 only by a simple operation of the lever 144 during the shower. On the other hand, when a bidet nozzle is couple thereto, the shower head 100 may be used as a substitute for the bidet. Alternatively, different injection nozzles 150 for various purposes such as a nozzle with a cleaning tool, a nozzle with a toothbrush, etc. may be detachably and replaceably coupled to the direct water injection hole 113 for various uses.

As described above, the multipurpose shower head 100 according to an embodiment of the present invention can inject waters at different pressures and quantities of water through any one selected among the direct water injection hole 113, the high-pressure spray hole 121 and the low-pressure spray hole 122, which are formed at three different positions, respectively, only by simply operating the lever 144. Further, since different injection nozzles 150 having various functions may be detachably and replaceably coupled to the direct water injection hole 113, the use of a product can be flexibly diversified according to required uses to thus maximize use convenience of the product while use satisfaction and value of the product may also be greatly improved.

In the detailed description of the present invention, it has been described with reference to preferred embodiments of the present invention, however, those skilled in the art or those having ordinary knowledge in the art would appreciate that various modifications and variations of the present invention may be possible within the range not departing from the spirit and technical scope of the present invention described in the appended claims to be described later.

INDUSTRIAL APPLICABILITY

The present invention relates to a multipurpose shower head, and more particularly, to a multipurpose shower head capable of injecting water supplied from a water supply line like a shower through a plurality of spray holes when having a shower.

The invention claimed is:
1. A multipurpose shower head, comprising:
a head body in which a main chamber receiving water from a water supply line is provided, a direct water injection hole through which an injection nozzle is detachably and replaceably coupled with the head body is provided, and a direct water supply pipe communicating with the direct water injection hole is provided;
a spray cover installed in the head body, in which a plurality of high-pressure spray holes and a plurality of low-pressure spray holes are provided such that the plurality of high-pressure spray holes and the low-pressure spray holes are distinguished from each other;
a chamber forming means installed in the head body, wherein the chamber forming means is disposed between the main chamber and the spray cover such that first to third chambers communicating with the high-pressure spray holes, the low-pressure spray holes and the direct water supply pipe, respectively, are provided between the spray cover and the chamber forming means; and
a water channel switching means which is provided on each of the chamber forming means and the head body in order to selectively transfer the water supplied in the main chamber to any one of a first chamber, a second chamber, or a third chamber, whereby the water can be discharged to the outside of the head body through any one selected from the high-pressure spray holes, the low-pressure spray holes and the direct water injection hole,
wherein the chamber forming means includes:
a sealing cover, which is detachably installed in the head body to thus be disposed between the main chamber and the spray cover so as to seal the main chamber, and is provided with a chamber forming groove between the spray cover and the chamber forming means, as well as a direct water supply hole communicating with the direct water supply pipe;
a first partition wall, which protrudes from the chamber forming groove and is in close contact with a spray cover side to thus be positioned between the plurality of high-pressure spray holes and low-pressure spray holes, wherein the first chamber is formed inside of the first partition wall to communicate with the plurality of high-pressure spray holes while the second chamber is formed on the outside of the first partition wall to communicate with the plurality of low-pressure spray holes; and
a second partition wall, which protrudes from the chamber forming groove to surround the direct water supply hole and is in close contact with the spray cover, wherein the third chamber is formed inside of the second partition wall to communicate with the direct water supply pipe while the second chamber is formed on the outside of the second partition wall to communicate with the plurality of low-pressure holes.
2. The multipurpose shower head according to claim 1, wherein the water channel switching means includes:
a first protrusion, which protrudes from the chamber forming means such that the first protrusion is adjacent to the first chamber, wherein a first communication hole is provided to communicate the main chamber with the first chamber so as to supply the water of the main chamber to the first chamber;
a second protrusion, which protrudes from the chamber forming means such that the second protrusion is adjacent to the first protrusion, wherein a second communication hole is provided to communicate the main chamber with the second chamber so as to supply the water of the main chamber to the second chamber;

a third protrusion, which protrudes from the chamber forming means such that the third protrusion is adjacent to the second protrusion, wherein a third communication hole is provided to communicate the main chamber with the third chamber so as to supply the water of the main chamber to the third chamber;

a lever which is rotatably installed inside the head body such that a part thereof protrudes to the outside of the head body; and a water channel switching plate, which rotates in conjunction with the lever depending on rotation of the lever, so as to selectively open any one among the first to third communication holes.

3. The multipurpose shower head according to claim 2, wherein the water channel switching means further includes:

a position fixing unit rotating in conjunction with the lever as the lever is rotated, thereby securing the position of the water channel switching plate, so that only one of the first to third communication holes can be selectively opened.

4. The multipurpose shower head according to claim 3, wherein the position fixing unit includes:

first to third position fixing holes formed at a predetermined interval in the water channel switching plate; and a stopper, which is inserted into any one among the first to third position fixing holes by rotation of the water channel switching plate to secure the position of the water channel switching plate.

5. The multipurpose shower head according to claim 2, wherein the water channel switching plate includes:

a rotary plate body connected to the lever so as to be interlocked with the lever;

an open hole formed on the rotary plate body to open any one of the first to third communication holes when the rotary plate body rotates in conjunction with the lever; and sealing protrusions, which protrude from the rotary plate body such that the sealing protrusions are disposed in pairs at opposite sides relative to the open hole, so as to close the communication holes except for the one opened by the open hole among the first to third communication holes.

6. The multipurpose shower head according to claim 1, wherein the injection nozzle detachably and replaceably coupled to the direct water injection hole is a water-pick nozzle.

7. The multipurpose shower head according to claim 6, wherein the water-pick nozzle includes:

a nozzle cap, which is detachably and replaceably fastened to the direct water injection hole and is provided with a through-hole; and a nozzle body, which is slidingly inserted and fastened to the direct water supply pipe in the form of a piston so that at least a portion of the nozzle body is pushed by water pressure and protrudes toward the outside of the nozzle cap, thereby injecting the water from the direct water supply pipe to the outside in the form of direct water.

8. The multipurpose shower head according to claim 7, wherein the nozzle body has an upper end inclined toward the opposite side of the spray cover at a predetermined angle so that the water from the direct water supply pipe can be injected to the opposite side of the spray cover.

9. The multipurpose shower head according to claim 7, wherein the water-pick nozzle further includes a replacement tip detachably and replaceably coupled to an upper end of the nozzle body.

\* \* \* \* \*